UNITED STATES PATENT OFFICE.

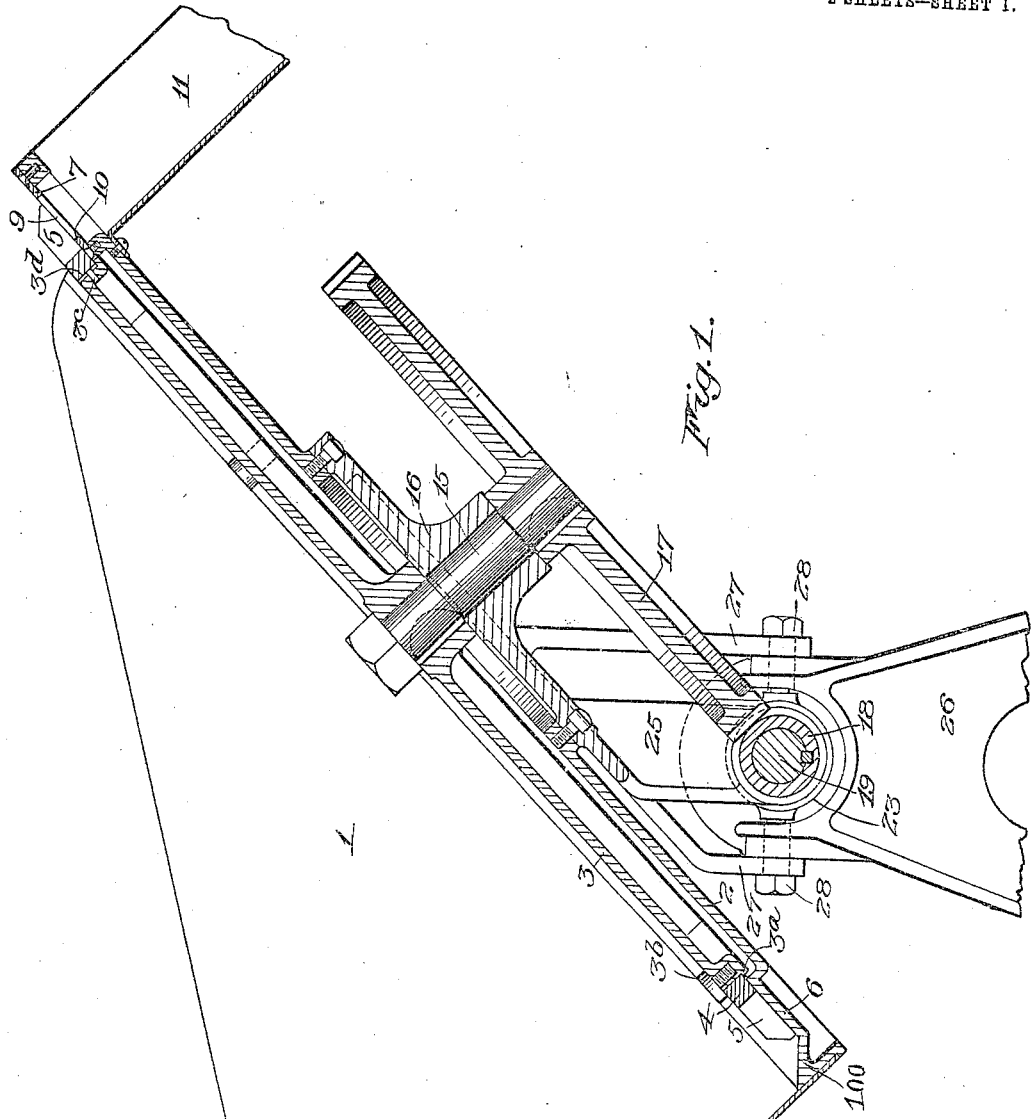

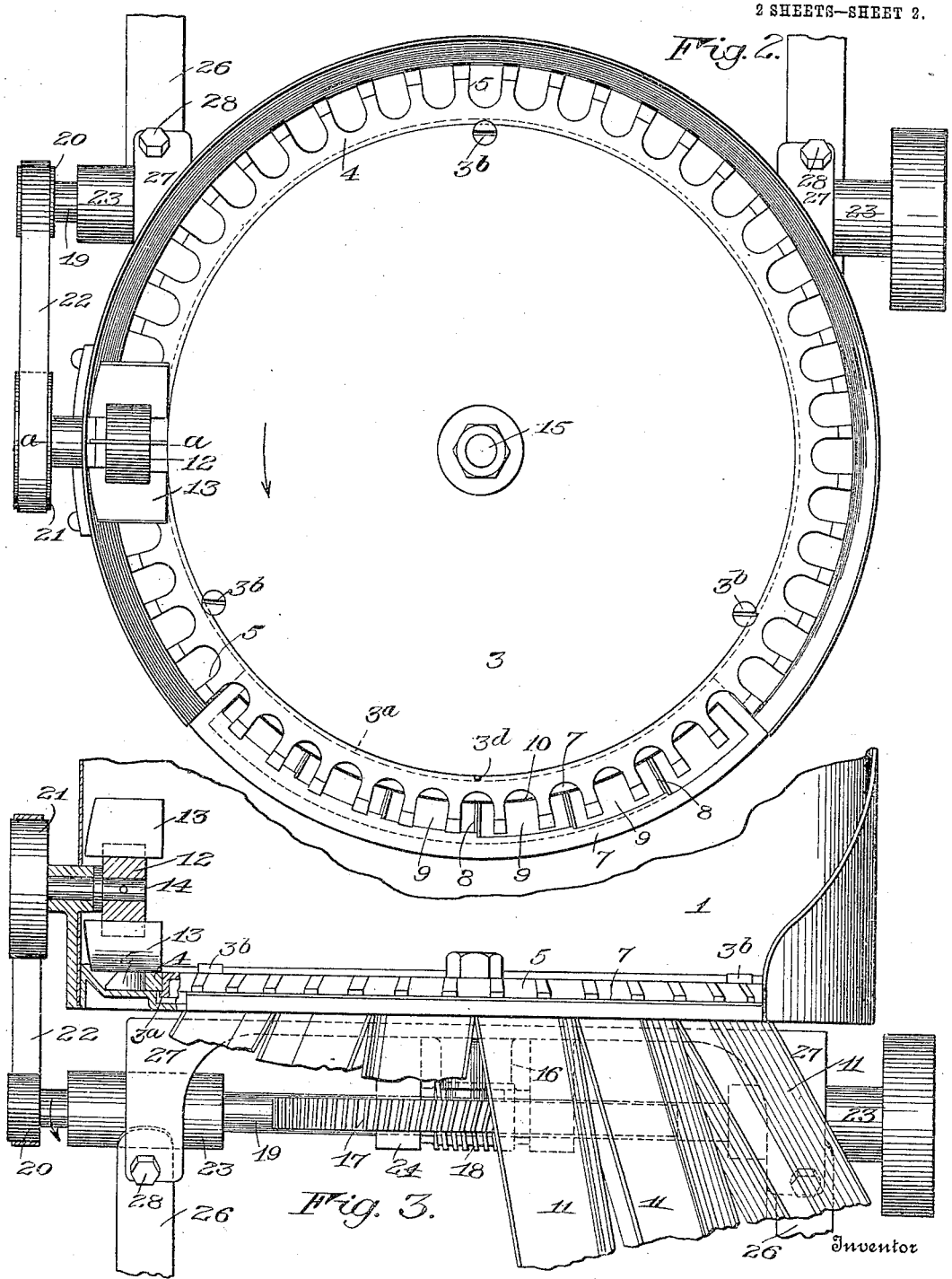

HERBERT HASTINGS, OF ROCHESTER, NEW YORK, ASSIGNOR TO GERMAN-AMERICAN BUTTON CO., OF ROCHESTER, NEW YORK, A CORPORATION OF NEW YORK.

SEPARATING-MACHINE.

957,332.  Specification of Letters Patent.  Patented May 10, 1910.

Application filed July 3, 1908. Serial No. 441,719.

*To all whom it may concern:*

Be it known that I, HERBERT HASTINGS, of Rochester, in the county of Monroe and State of New York, have invented certain new and useful Improvements in Separating-Machines; and I do hereby declare the following to be a full, clear, and exact description of the same, reference being had to the accompanying drawings, forming a part of this specification, and to the reference-numerals marked thereon.

The present invention relates to separating machines, and it has for an object to provide a machine capable of separating ivory nuts or seeds of the *Phytelephas macrocarpa* or corozo, according to their lengths.

To this and other ends the invention consists in certain improvements and combinations of parts as will be hereinafter more fully described, the novel features being pointed out in the claims at the end of the specification.

In the drawings: Figure 1 is a sectional view of a machine constructed in accordance with this invention, looking in the direction of the axis of the rotary feeder; Fig. 2 is a detail view looking in the direction of the axis of the rotary feeder, parts being shown in section; and Fig. 3 is a detail section on line $a$—$a$ Fig. 2.

In order to utilize as much of ivory nuts as possible for making buttons it is necessary to separate them according to their sizes, the nuts being cut differently for different sizes. Heretofore, they have only been separated according to their transverse diameters, their lengths not being considered in the separation, while, with the present invention, after they have been separated according to their widths, they can be separated according to their lengths.

The articles to be separated may be arranged in a hopper or container 1 which preferably has an inclined wall 2 forming a table on which is arranged a feeder or conveyer, preferably in the form of a wheel or disk, 3, supported in any suitable manner so as to rotate in a plane parallel with said wall, as for instance in the manner shown and to be hereinafter particularly described. The periphery of this disk or wheel 3 may be provided with a ring 4 which is formed with a series of recesses 5 open at their tops and bottoms so as to permit articles to enter through the tops and to be discharged through the bottom, while the outer ends or sides of the recesses are open to permit articles of various lengths to be received and at the same time to be discharged easily, lodgment within the recesses being practically impossible. In the present instance, the ring 4 rests on an annular flange $3^a$ and is held thereto by the heads of screws $3^b$, a pin $3^c$ on the disk fitting in a groove $3^d$ in the ring to insure the latter turning with the disk. The toothed or recessed portion of the feeder being separate from the other portion enables the machine to be repaired at less cost than if it were in one piece, and at the same time permits rings having recesses of other widths to be employed so that articles of different widths may be separated.

In order to support the articles in the recesses, the ring portion travels over an annular elevated portion 6 on the inclined wall while preferably at the upper portion of the latter is arranged the separating device which may embody a plate 7 over which the recesses of the feeder travel provided with a slot of varying width divided by partitions 8 into an arcuate series of openings 9 of different widths, the smallest opening being reached by the feeder before the larger ones. The lower or inner walls 10 of the openings lie beyond the inner ends or sides of the recesses so as to support the articles at their inner ends until the proper opening is reached, when the articles drop at their outer ends and fall into one of the chutes or other receiving devices 11.

Owing to the fact that the table or wall of the hopper is inclined, the articles within the recesses of the feeder are caused to move by gravity toward the inner or closed sides of the recesses. This action is also assisted by a suitable means which coöperates with those ends of the articles that project from the open outer sides of the recesses and moves them toward the closed sides. In this instance this means is in the form of an inclined surface 100 which partially surrounds the feeder, being formed at the edge of the elevated portion 6 of the inclined wall. With this arrangement the inner ends of articles have a definite or fixed relation to the inner walls 10 of the separating openings, while the outer ends of the article vary according to the lengths of the latter and when they fail to have any support, owing to the proper separating opening having been reached, the articles drop from the recesses in the feeder to their respective chutes.

Before the articles reach the separating device they are acted on by a wiper which preferably rotates about an axis at right angles to the axis of the rotary feeder and comprises a rotary wheel 12 formed with a series of radially arranged flexible blades 13 and carried by a shaft 14 which may be journaled in one wall of the hopper and driven preferably in a manner to be described.

The rotatable feeder may be carried by a shaft 15 which is journaled in a bearing piece 16 that is bolted to the under side of the inclined wall of the hopper. The shaft 15 may carry a worm wheel 17 driven by a worm 18 on a drive shaft 19, and the drive shaft 19 may have a pulley 20 which is connected to a pulley 21 on the wiper shaft 14 by a belt 22.

In order to provide for alining the bearings of the drive shaft 19 I mount two end bearings 23 so that they will rock and provide on opposite sides of the worm, two intermediate bearings 24 which are rigidly connected by integral arms 25 to the bearing piece 16 that is bolted to the inclined wall of the hopper, in order that proper engagement of the worm wheel and worm may be maintained.

The hopper or container may be supported on a base 26 in any suitable manner but vibrations will be reduced to a minimum if the bearing piece 16 be provided on opposite sides with a pair of integral depending arms 27 which may be secured to opposite sides of the base uprights by bolts 28 that also serve as pivots for the bearings 23.

In operation the shaft 19 is driven in any suitable manner and transmits motion to the wiper and to the feeder. The latter carries the articles to the separating device, and the former removes all surplus articles from the feeder before the separating device is reached.

While the present embodiment of this invention has been particularly designed for separating ivory nuts according to their lengths, it is apparent that the invention is capable of being embodied in machines for separating other articles. The construction herein shown is inexpensive to manufacture, and having few parts is simple to operate and not liable to get out of order.

What I claim is:

1. The combination with a feeder having a plurality of recesses therein open at their tops and their bottoms, of an inclined table arranged to coöperate with the feeder to support the articles in the recesses and to direct each article toward one wall of a recess, and a separating device over which the articles are carried having a plurality of openings of different sizes, the inner wall of each opening being arranged beyond the walls of recesses to which the articles are carried by the inclined table, so that the articles are supported in the recesses until the proper opening is reached.

2. The combination with a rotary feeder having recesses in its periphery open at their tops, bottoms and outer sides, of an inclined table arranged to coöperate with the feeder to support the articles in the recesses and to direct each article toward the inner side wall of the feeder, and a separating device over which the articles are carried by the feeder, having a plurality of openings of different sizes, the inner wall of each opening being arranged beyond the inner walls of recesses to which the articles are carried by the inclined table so that the articles are supported in the recesses until the proper opening is reached.

3. The combination with a feeder having a plurality of recesses open at their tops, their bottoms and their outer sides, of a table coöperating with the feeder to support the articles in the pockets, means for coöperating with those ends of the articles projecting from the outer sides of recesses of the feeder to move the articles into engagement with the inner side walls of said recesses and a separating device over which the articles are carried by the feeder.

4. The combination with a feeder having a plurality of recesses open at their tops, their bottoms, and their outer sides, of a table coöperating with the feeder to support the articles in the recesses, an inclined surface past which the recesses are carried to cause the portions of the articles projecting from the outer sides of the recesses to be forced toward the inner side walls of the recesses, and a separating device over which the articles are carried by the feeder.

5. The combination with a rotary feeder having a plurality of recesses in its periphery open at their tops, their bottoms, and their outer sides, of a table arranged to support the articles in the recesses, an inclined surface partially surrounding the feeder to coöperate with those ends of the articles projecting from the outer sides of the recesses, and a separating device over which the articles are carried by the feeder.

6. The combination with a hopper having an inclined wall, of a separating device arranged at the upper portion of the wall and having a series of openings of different sizes, and a feeder operating over said wall and separating device about an axis substantially perpendicular to said wall and having recesses in its periphery opening at their tops, bottoms, and outer ends, the inner walls of the recesses being nearer to the axis of the feeder than the inner walls of the separating openings so that ledges are formed to support the articles until the proper opening is reached.

7. The combination with a hopper having an inclined wall, of a feeder rotatable about an axis substantially perpendicular to said wall and having recesses formed therein, a separating device having a series of openings of different sizes arranged at the upper portion of the wall in such a position that the recesses are caused to travel thereover, a wiper coöperating with the feeder at a point in advance of the separating device and mechanism for operating the wiper and the feeder.

8. The combination with a table, of a bearing piece bolted to said table, a shaft journaled in the bearing piece, a feeder secured to the shaft, a worm wheel carried by the shaft, a worm meshing with the worm wheel, bearings on opposite sides of the worm rigidly secured to the bearing for the shaft of the feeder and the worm wheel, and a separating device for articles received from the feeder.

9. The combination with a table, of a bearing piece secured to said table, a shaft journaled in said bearing piece, a feeder operating upon the shaft, a worm wheel secured to the shaft, a worm meshing with the worm wheel, rocking bearings for the worm, a base, a pair of arms rigidly secured to each end of the bearing piece for the feeder shaft, and means securing said arms to the base forming pivots for the rocking bearing pieces.

10. The combination with a table, of a bearing piece bolted to said table, a shaft journaled in said bearing piece, a feeder secured to the shaft, a worm wheel secured to the shaft, a worm meshing with the worm wheel, rocking bearings for said worm, a base, a pair of integral arms at each end of the bearing piece for the feeder shaft, and bolts securing said arms to the base and forming pivots for the rocking bearing pieces, and a separating device for articles received from the feeder.

11. The combination with a wall, of a feeder, a shaft for the feeder, a worm wheel secured to the shaft, a worm meshing with shaft, a bearing for the worm rigid with the worm wheel, a bearing for the feeder the bearing for the feeder shaft, rocking bearings for the worm on opposite sides of its first mentioned bearing and a separating device for articles received from the feeder.

HERBERT HASTINGS.

Witnesses:
RUSSELL B. GRIFFITH,
HAROLD H. SIMMS.